3,186,978
METHOD FOR PURIFYING OLEFIN POLYMERS
Cornelio Caldo and Giorgio Leicht, Terni, Italy, assignors to Montecatini, Società Generale per l'Industria Mineraria e Chimica, Milan, Italy
No Drawing. Filed Apr. 6, 1961, Ser. No. 101,067
Claims priority, application Italy, Apr. 11, 1960, 6,413/60
8 Claims. (Cl. 260—93.7)

The present invention relates to a method for purifying the polymers obtained by the stereospecific polymerization of olefins, more particularly polymers of propylene.

Processes are known for polymerizing alpha-olefins with catalysts comprising at least an organometallic compound of a metal belonging to the 1st, 2nd or 3rd group of the Mendeleeff Periodic Table and a solid crystalline halide of a transition metal belonging to the 4th, 5th or 6th group of the same Periodic Table. These known processes are generally carried out in the presence or absence of activators such as pyridine, phosphines, arsines, bismuthines and/or ethers.

Said processes substantially comprise the introduction of the monomer, the solvent, which dissolves the olefin and acts as a suspending medium for the polymer formed, and the catalyst system, preferably consisting of an alkyl aluminium or an alkyl beryllium and titanium trichloride or a vanadium halide, into the polymerization reactor.

The polymerization is carried out for a given period of time (10-100 hours) at a temperature of 30–90° C. under a pressure of 1 to 15 atm.

It is known that in order to purify the polymer, the slurries obtained at the end of the polymerization, have been subjected to various treatments.

Such treatments consist of contacting these slurries with compounds such as, alcohols, organic acids, mineral acids, or alkalies.

Compounds having the capacity to form complexes have also been proposed as "clarification agents" for the polymer slurries.

It has been now surprisingly found that as clarification agents there can be used compounds of the following general Formula A:

wherein $R_1$ and $R_2$, equal to or different from each other, individually represent hydrogen, alkyl, aryl or alkylaryl, or jointly represent a cycloparaffinic radical.

An object of the present invention is therefore to provide a method for purifying polymers of olefins, especially polymers of ethylene, propylene, butene-1, pentene, hexene and methyl pentene and particularly crystalline isotactic polymers of propylene; these polymers being obtained by the polymerization of the olefins using catalysts which promote stereospecific polymerizations.

This object is achieved by a treatment of the polymerization slurries, at the end of the polymerization, with a compound of the above general Formula A, such as by contacting these slurries with a compound of said general Formula A.

The compounds of general Formula A can be added to the polymer slurries at the end of the polymerization, either alone or dissolved or dispersed in inert solvents.

Hydrocarbon solvents such as benzene, toluene, cyclohexene, n-heptane, isopropylbenzene and the like are preferably used as the inert solvent.

After clarification of the polymerization slurry with compounds of the above general Formula A, the polymer is preferably subjected to a treatment with water or steam in order to remove both the hydrocarbon solvent and the clarification agent. This treatment either dissolves the compounds of general Formula A or removes them by mechanical entrainment.

Compounds of general Formula A, such as acetophenone oxime, benzophenone oxime and cyclohexanone oxime are particularly suitable for use in the clarification of the polymerization slurries according to the present invention.

The polymers purified according to the present invention possess a very low ash content (lower than 0.1%) and these highly pure polymers are therefore particularly suitable for use in the production of fibres and films and other articles.

The amount of the compounds of general Formula A added to the polymerization slurry, according to the invention, can vary within wide limits. These compounds are preferably added in amounts between 10% and 1000% based on the total weight of the active catalyst.

The following examples are given to illustrate the present invention without limiting its scope.

*Example 1*

80 litres of n-heptane, 179 g. of $Al(C_2H_5)_3$ in a 10% heptane solution and 121 g. of $TiCl_3$ are introduced into a 200-l. stainless autoclave. The mixture is heated to 75° C. A propylene feed is then started and continued until 125 l. of liquid monomer are absorbed. The polymerization proceeds for 12 hours at 75° C. The un-polymerized monomer is removed and recovered.

The polymerization slurry is transferred into a 400-l. enamelled reactor where it is contacted with 1.2 kg. of cyclohexanone oxime in 25 l. of n-heptane according to the present invention.

The slurry is agitated at 90° C. for 3 hours and then centrifuged in order to remove the solvent. The cake thus obtained is then treated with steam. The polymer, after centrifugation and drying, possesses an ash content of 0.031%.

*Example 2*

The polymerization slurry, obtained according to the process described in the preceding example, is transferred in a 400-l. enamelled reactor where it is contacted with 1 kg. of acetophenone oxime in 25 l. of n-heptane according to the present invention. The slurry is kept agitated at 90° C. for 3 hours and then centrifuged in order to remove the solvent. The cake thus obtained is treated with steam. The polymer, after centrifugation and drying, possesses an ash content of 0.04%.

*Example 3*

The polymerization slurry, obtained according to the process described in the Example 1, is transferred in a 400-l. enamelled reactor where it is contacted with 1.7 kg. of benzophenone oxime in 25 l. of n-heptane according to the present invention. The slurry is kept agitated at 90° C. for 3 hours and then centrifuged in order to remove the solvent. The cake thus obtained is treated with steam. The polymer after centrifugation and drying, possesses an ash content of 0.07%.

Many variations can of course be made without departing from the spirit of the present invention.

Having thus described the present invention, what it is desired to secure and claim by Letters Patent is:

1. A method for purifying polymers obtained by the polymerization of olefins in the presence of catalysts comprising an organometallic compound of a metal selected from the group consisting of the 1st, 2nd and 3rd groups of the Mendeleeff Periodic Table and a solid crystalline halide of a transition metal selected from the group consisting of the 4th, 5th and 6th groups of the same table, characterized in that the polymerization slurry is treated, at the termination of the polymerization, with a compound of the general formula:

wherein $R_1$ and $R_2$ are selected from the group consisting of hydrogen, alkyl radicals, aryl radicals, alkylaryl radicals and cycloparaffinic radicals.

2. A method according to claim 1, wherein the polymerization slurry is treated with cyclohexanone oxime.

3. A method according to claim 1, wherein the polymerization slurry is treated with acetophenone oxime.

4. A method according to claim 1, wherein the polymerization slurry is treated with benzophenone oxime.

5. A method according to claim 1, wherein the olefin is propylene.

6. A method according to claim 1, wherein said compound for treating the polymerization slurry is employed in an inert solvent.

7. A method according to claim 1, wherein said compound for treating the polymerization slurry is used in an amount varying from 10% to 1000% of the total weight of the active catalyst.

8. A method according to claim 1, wherein after the treatment of the polymerization slurry with a compound of general Formula A, the polymer is treated with a member selected from the group consisting of water and steam.

References Cited by the Examiner
UNITED STATES PATENTS
3,014,016   12/61   Natta et al. _____ 260—94.9

FOREIGN PATENTS
554,363   7/57   Belgium.

OTHER REFERENCES
Degering: "An Outline of Organic Nitrogen Compounds," p. 185, University Lithoprinters (Michigan, 1950).

JOSEPH L. SCHOFER, *Primary Examiner.*

M. LIEBMAN, *Examiner.*